US012181056B2

(12) United States Patent
Alcorn (10) Patent No.: US 12,181,056 B2
(45) Date of Patent: Dec. 31, 2024

(54) PASSIVE BACKFLOW PREVENTION APPARATUS AND ASSOCIATED TOILET SYSTEM AND METHOD

(71) Applicant: A Shane Alcorn, Millcreek, UT (US)

(72) Inventor: A Shane Alcorn, Millcreek, UT (US)

( * ) Notice: Subject to any disclaimer, the term of this patent is extended or adjusted under 35 U.S.C. 154(b) by 0 days.

(21) Appl. No.: 18/298,989

(22) Filed: Apr. 11, 2023

(65) Prior Publication Data

US 2023/0332701 A1    Oct. 19, 2023

Related U.S. Application Data

(60) Provisional application No. 63/331,096, filed on Apr. 14, 2022.

(51) Int. Cl.
    *F16K 15/03*       (2006.01)
    *E03D 11/16*       (2006.01)

(52) U.S. Cl.
    CPC ............... *F16K 15/03* (2013.01); *E03D 11/16* (2013.01); *Y10T 137/7874* (2015.04); *Y10T 137/7875* (2015.04); *Y10T 137/7902* (2015.04)

(58) Field of Classification Search
    CPC ... F16K 15/03; E03D 11/16; Y10T 137/7875; Y10T 137/7874; Y10T 137/7898; Y10T 137/7903; Y10T 137/7783; Y10T 137/7902
See application file for complete search history.

(56) References Cited

U.S. PATENT DOCUMENTS

| | | | | |
|---|---|---|---|---|
| 3,565,107 A | * | 2/1971 | Bunch | F16K 15/03 137/515.7 |
| 3,821,820 A | | 7/1974 | Thompson | |
| 4,825,902 A | * | 5/1989 | Helms | E21B 21/10 137/515 |
| 4,860,789 A | * | 8/1989 | Scaramucci | F16K 15/03 137/515.7 |
| 4,863,458 A | * | 9/1989 | Bokros | F16K 15/036 623/2.26 |
| 4,905,728 A | * | 3/1990 | Scaramucci | F16K 15/03 137/515.7 |
| 4,926,945 A | * | 5/1990 | Pringle | F16K 15/035 166/321 |

(Continued)

FOREIGN PATENT DOCUMENTS

CA        2419028       11/2003

*Primary Examiner* — Daphne M Barry
*Assistant Examiner* — Frederick D Soski
(74) *Attorney, Agent, or Firm* — Kunzler Bean & Adamson (57) ABSTRACT

A passive backflow prevention apparatus includes a tubular base that has a non-planar end defining an opening. The passive backflow prevention apparatus also includes a flap assembly that includes a non-planar flap. The passive backflow prevention apparatus further includes a hinge that pivotably couples together the tubular base and the flap assembly such that the flap assembly is pivotable from an open position, in which the non-planar flap of the flap assembly is disengaged with the non-planar end to enable a fluid, flowing in a first direction, through the opening, to a closed position, in which the non-planar flap of the flap assembly is engaged with the non-planar end to prevent a fluid, flowing in a second direction, through the opening.

18 Claims, 10 Drawing Sheets

(56) References Cited

U.S. PATENT DOCUMENTS

| | | | | |
|---|---|---|---|---|
| 5,044,396 | A * | 9/1991 | Daudet | F16K 15/03 137/527.6 |
| 5,161,566 | A * | 11/1992 | Scaramucci | F16K 15/033 137/328 |
| 5,161,570 | A * | 11/1992 | Scaramucci | F16K 15/03 137/527.4 |
| 5,191,913 | A * | 3/1993 | Scaramucci | F16K 15/03 137/454.2 |
| 5,236,007 | A * | 8/1993 | Scaramucci | F16K 15/03 137/454.2 |
| 5,251,657 | A * | 10/1993 | Scaramucci | F16K 15/03 137/454.6 |
| 5,682,921 | A * | 11/1997 | Rawson | E21B 34/06 137/527.6 |
| 5,862,533 | A | 1/1999 | Johnson et al. | |
| 6,295,656 | B1 * | 10/2001 | Tillen | E03D 9/05 4/352 |
| 6,305,411 | B1 * | 10/2001 | Youssef | F16K 15/03 137/448 |
| 7,284,286 | B1 | 10/2007 | Kopplin et al. | |
| 7,798,235 | B2 * | 9/2010 | Mondelli | E21B 34/10 137/527 |
| 8,230,533 | B2 | 7/2012 | Jorsch et al. | |
| 8,555,428 | B2 | 10/2013 | Blake et al. | |
| 9,611,633 | B2 | 4/2017 | Blake et al. | |
| 9,988,802 | B1 | 6/2018 | Smith et al. | |
| 10,066,380 | B2 | 9/2018 | Jorsch et al. | |
| 10,392,790 | B2 | 8/2019 | Seike et al. | |
| 10,428,509 | B2 | 10/2019 | Smith et al. | |
| 10,995,481 | B2 | 5/2021 | Veros et al. | |
| 11,021,862 | B2 | 6/2021 | Schuster | |
| 2001/0023705 | A1 * | 9/2001 | Coscarella | F16K 31/20 137/448 |
| 2001/0023706 | A1 * | 9/2001 | Coscarella | F16K 31/34 137/467 |
| 2001/0023707 | A1 * | 9/2001 | Coscarella | F16K 15/03 137/420 |
| 2002/0023294 | A1 | 2/2002 | Spells | |
| 2003/0221723 | A1 * | 12/2003 | Colton, Sr. | F16K 17/105 137/218 |
| 2008/0148469 | A1 | 6/2008 | Dipzinki et al. | |
| 2008/0175726 | A1 * | 7/2008 | Bartell | F16L 55/1022 417/279 |
| 2009/0008588 | A1 * | 1/2009 | Giehl | E03F 7/06 251/157 |
| 2010/0078083 | A1 * | 4/2010 | Coscarella | F16K 31/22 137/527 |
| 2010/0276015 | A1 * | 11/2010 | Schafer | F16K 1/2028 137/527 |
| 2011/0259447 | A1 * | 10/2011 | Ishizaka | F16K 15/033 137/511 |
| 2012/0279586 | A1 * | 11/2012 | Kim | E03F 7/04 137/527 |
| 2012/0291190 | A1 * | 11/2012 | Halloran | E03D 11/16 29/428 |
| 2012/0325341 | A1 * | 12/2012 | Kelly | E03F 5/042 137/520 |
| 2013/0205488 | A1 * | 8/2013 | Laundre | E03D 11/16 4/420 |
| 2013/0220448 | A1 * | 8/2013 | Coscarella | F16K 31/22 137/385 |
| 2014/0144524 | A1 * | 5/2014 | Coscarella | F16K 15/1821 137/448 |
| 2014/0261789 | A1 * | 9/2014 | Hull | A01D 41/1271 137/527.8 |
| 2014/0345716 | A1 * | 11/2014 | Curinier | F16L 55/1018 137/527 |
| 2014/0373943 | A1 * | 12/2014 | Huber | F16K 15/031 137/512 |
| 2015/0219229 | A1 * | 8/2015 | Chaffee | F16K 15/031 137/14 |
| 2015/0247311 | A1 * | 9/2015 | Alcorn | E03D 11/02 4/427 |
| 2017/0321410 | A1 | 11/2017 | Connell | |
| 2018/0328016 | A1 * | 11/2018 | Villalobos Lopez | F16K 15/03 |
| 2020/0362546 | A1 * | 11/2020 | Lei | F16K 15/04 |
| 2020/0393442 | A1 * | 12/2020 | Hall | A47K 17/028 |
| 2021/0047823 | A1 * | 2/2021 | Coscarella | F16K 15/1821 |
| 2022/0251820 | A1 * | 8/2022 | Mantyla | F16K 31/28 |
| 2023/0137859 | A1 * | 5/2023 | Tsubone | E03D 11/18 4/421 |
| 2023/0138880 | A1 * | 5/2023 | Sone | E03D 11/13 4/252.1 |
| 2023/0332701 | A1 * | 10/2023 | Alcorn | E03D 11/16 |

* cited by examiner

PASSIVE BACKFLOW PREVENTION APPARATUS AND ASSOCIATED TOILET SYSTEM AND METHOD

CROSS-REFERENCE TO RELATED APPLICATION

This application claims the benefit of U.S. Provisional Patent Application No. 63/331,096, filed Apr. 14, 2022, which is incorporated herein by reference.

FIELD

This disclosure relates generally to plumbing components, and more particularly to plumbing components associated with the operation of toilets.

BACKGROUND

Toilet backflow occurs when water and sewage starts flowing in a reverse direction into a toilet. Enough backflow entering the toilet can cause the water and sewage in the toilet to overflow from the toilet, thus potentially causing sever damage to the underlying structure (e.g., floor). Existing backflow preventors do not adequately prevent backflow from entering a toilet.

SUMMARY

The subject matter of the present application has been developed in response to the present state of the art, and in particular, in response to the shortcomings of toilet systems that fail to adequately prevent backflow from entering into a toilet. Accordingly, the subject matter of the present application has been developed to provide a passive backflow prevention apparatus, toilet system, and associated method that overcome at least some of the above-discussed shortcomings of prior art techniques.

The following is a non-exhaustive list of examples, which may or may not be claimed, of the subject matter, disclosed herein.

Disclosed herein is a passive backflow prevention apparatus. The passive backflow prevention apparatus comprises a tubular base, comprising a non-planar end that defines an opening. The passive backflow prevention apparatus also comprises a flap assembly, comprising a non-planar flap. The passive backflow prevention apparatus further comprises a hinge, pivotably coupling together the tubular base and the flap assembly such that the flap assembly is pivotable from an open position, in which the non-planar flap of the flap assembly is disengaged with the non-planar end to enable a fluid, flowing in a first direction, through the opening, to a closed position, in which the non-planar flap of the flap assembly is engaged with the non-planar end to prevent a fluid, flowing in a second direction, through the opening. The preceding subject matter of this paragraph characterizes example 1 of the present disclosure.

The hinge is fixed to a circumferential surface of the tubular base such that the flap assembly pivots about an axis that is perpendicular to the first direction and the second direction. The preceding subject matter of this paragraph characterizes example 2 of the present disclosure, wherein example 2 also includes the subject matter according to example 1, above.

The non-planar flap is arc-shaped and curves about an axis that is perpendicular to the axis. The preceding subject matter of this paragraph characterizes example 3 of the present disclosure, wherein example 3 also includes the subject matter according to example 2, above.

The non-planar flap is confined within a footprint of the tubular base when the flap assembly is in the open position or in the closed position. The preceding subject matter of this paragraph characterizes example 4 of the present disclosure, wherein example 4 also includes the subject matter according to example 3, above.

In the closed position, the non-planar flap forms a seal against the non-planar end of the tubular base. The preceding subject matter of this paragraph characterizes example 5 of the present disclosure, wherein example 5 also includes the subject matter according to any of examples 1-4, above.

The tubular base further comprises an annular gasket. The annular gasket defines the non-planar end of the tubular base. The preceding subject matter of this paragraph characterizes example 6 of the present disclosure, wherein example 6 also includes the subject matter according to any of examples 3-5, above.

The flap assembly further comprises a float fixed to the non-planar flap. The float has a material density that is less than a material density of the non-planar flap. The preceding subject matter of this paragraph characterizes example 7 of the present disclosure, wherein example 7 also includes the subject matter according to any of examples 1-6, above.

The float comprises a pocket filled with air. The preceding subject matter of this paragraph characterizes example 8 of the present disclosure, wherein example 8 also includes the subject matter according to example 7, above.

The passive backflow prevention apparatus further comprises a second flap assembly, comprising a second non-planar flap and a second float fixed to the second non-planar flap. The passive backflow prevention apparatus also comprises a second hinge, pivotally coupling together the tubular base and the second flap assembly such that the second flap assembly is pivotable from a second open position, in which the second non-planar flap of the second flap assembly is disengaged with the non-planar end to enable the fluid, flowing in the first direction, through the opening, to a second closed position, in which the second non-planar flap of the second flap assembly is engaged with the non-planar end to prevent the fluid, flowing in the second direction, through the opening. The preceding subject matter of this paragraph characterizes example 9 of the present disclosure, wherein example 9 also includes the subject matter according to any of examples 1-8, above.

When the flap assembly is in the closed position and the second flap assembly is in the second closed position, the non-planar flap and the second non-planar flap are in direct contact with each other. The preceding subject matter of this paragraph characterizes example 10 of the present disclosure, wherein example 10 also includes the subject matter according to example 9, above.

At least one of the non-planar flap or the second non-planar flap comprises a gasket. When the flap assembly is in the closed position and the second flap assembly is in the second closed position, the gasket forms a seal between the non-planar flap and the second non-planar flap. The preceding subject matter of this paragraph characterizes example 11 of the present disclosure, wherein example 11 also includes the subject matter according to example 10, above.

When the flap assembly is in the closed position and the second flap assembly is in the second closed position, the non-planar flap covers a first half of the opening and the second non-planar flap covers a second half of the opening. The preceding subject matter of this paragraph characterizes example 12 of the present disclosure, wherein example 12 also includes the subject matter according to any of examples 9-11, above.

The tubular base further comprises a circumferential recessed ledge at a second end of the tubular base. The second end is opposite the non-planar end. The preceding subject matter of this paragraph characterizes example 13 of the present disclosure, wherein example 13 also includes the subject matter according to any of examples 1-12, above.

The passive backflow prevention apparatus further comprises a funnel, comprising an annular rim, a non-converging portion, and a converging portion, which is interposed between the annular rim and the non-converging portion. The non-converging portion is configured to be seated in the circumferential recessed ledge. The preceding subject matter of this paragraph characterizes example 14 of the present disclosure, wherein example 14 also includes the subject matter according to example 13, above.

The passive backflow prevention apparatus further comprises a wax ring coupled to the annular rim such that the annular rim is at least partially embedded in the wax ring. The preceding subject matter of this paragraph characterizes example 15 of the present disclosure, wherein example 15 also includes the subject matter according to example 14, above.

The passive backflow prevention apparatus further comprises a funnel, comprising an annular rim, a non-converging portion, and a converging portion, which is interposed between the annular rim and the non-converging portion. The tubular base is coupled to the non-converging portion such that the tubular base is a seamless extension of the non-converging portion. The preceding subject matter of this paragraph characterizes example 16 of the present disclosure, wherein example 16 also includes the subject matter according to any of examples 1-15, above.

The passive backflow prevention apparatus further comprises a wax ring coupled to the annular rim such that the annular rim is at least partially embedded in the wax ring. The preceding subject matter of this paragraph characterizes example 17 of the present disclosure, wherein example 17 also includes the subject matter according to example 16, above.

The non-planar flap is made of a material that has a material density less that water. The preceding subject matter of this paragraph characterizes example 18 of the present disclosure, wherein example 18 also includes the subject matter according to any of examples 1-17, above.

Additionally disclosed herein is a toilet system. The toilet system comprises a toilet, a toilet flange, comprising a receptacle and toilet-engaging slots, the toilet flange configured to be attached to the toilet, and a passive backflow prevention apparatus, positionable between the toilet and the toilet flange. The passive backflow prevention apparatus comprises a funnel, comprising an annular rim, a non-converging portion, and a converging portion, which is interposed between the annular rim and the non-converging portion. The passive backflow prevention apparatus also comprises a tubular base, coupled to the non-converging portion of the funnel and comprising a non-planar end that defines an opening. The passive backflow prevention apparatus further comprises a flap assembly, comprising a non-planar flap and a float fixed to the non-planar flap. The passive backflow prevention apparatus additionally comprises a hinge, pivotally coupling together the tubular base and the flap assembly such that the flap assembly is pivotable from an open position, in which the non-planar flap of the flap assembly is disengaged with the non-planar end, to a closed position, in which the non-planar flap of the flap assembly is engaged with the non-planar end. When positioned between the toilet and the toilet flange, at least a portion of the funnel, at least a portion of the flap assembly, and at least a portion of the hinge are positioned in the receptacle of the toilet flange. When the flap assembly is in the open position, a fluid, flowing in a first direction, through the toilet flange and away from toilet, is flowable through the opening. When the flap assembly is in the closed position, a fluid, flowing in a second direction, through the toilet flange and toward the toilet, is not flowable through the opening. The preceding subject matter of this paragraph characterizes example 19 of the present disclosure.

Further disclosed herein is a method of installing a toilet system. The method of installing a toilet system comprises steps of coupling a toilet flange to a drain pipe, attaching the toilet flange to a floor, inserting a passive backflow prevention apparatus into a receptacle of the toilet flange such that a flap assembly of the passive backflow prevention apparatus passes through and is at least partially positioned within the receptacle of the toilet flange and the drain pipe. The flap assembly is pivotable, within at least a portion of the receptacle and the drain pipe, from an open position to a closed position. The method of installing a toilet system also comprises a step of attaching a toilet to the toilet flange such that a wax ring of the passive backflow prevention apparatus is sandwiched between and forms a fluidic seal against the toilet flange and the toilet. The preceding subject matter of this paragraph characterizes example 20 of the present disclosure.

The method further comprises a step of forming the passive backflow prevention apparatus by attaching a funnel to a tubular base such that the funnel is seated in a circumferential ledge of the tubular base. The flap assembly is pivotably coupled to the tubular base via a hinge. The preceding subject matter of this paragraph characterizes example 20 of the present disclosure, wherein example 20 also includes the subject matter according to example 21, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
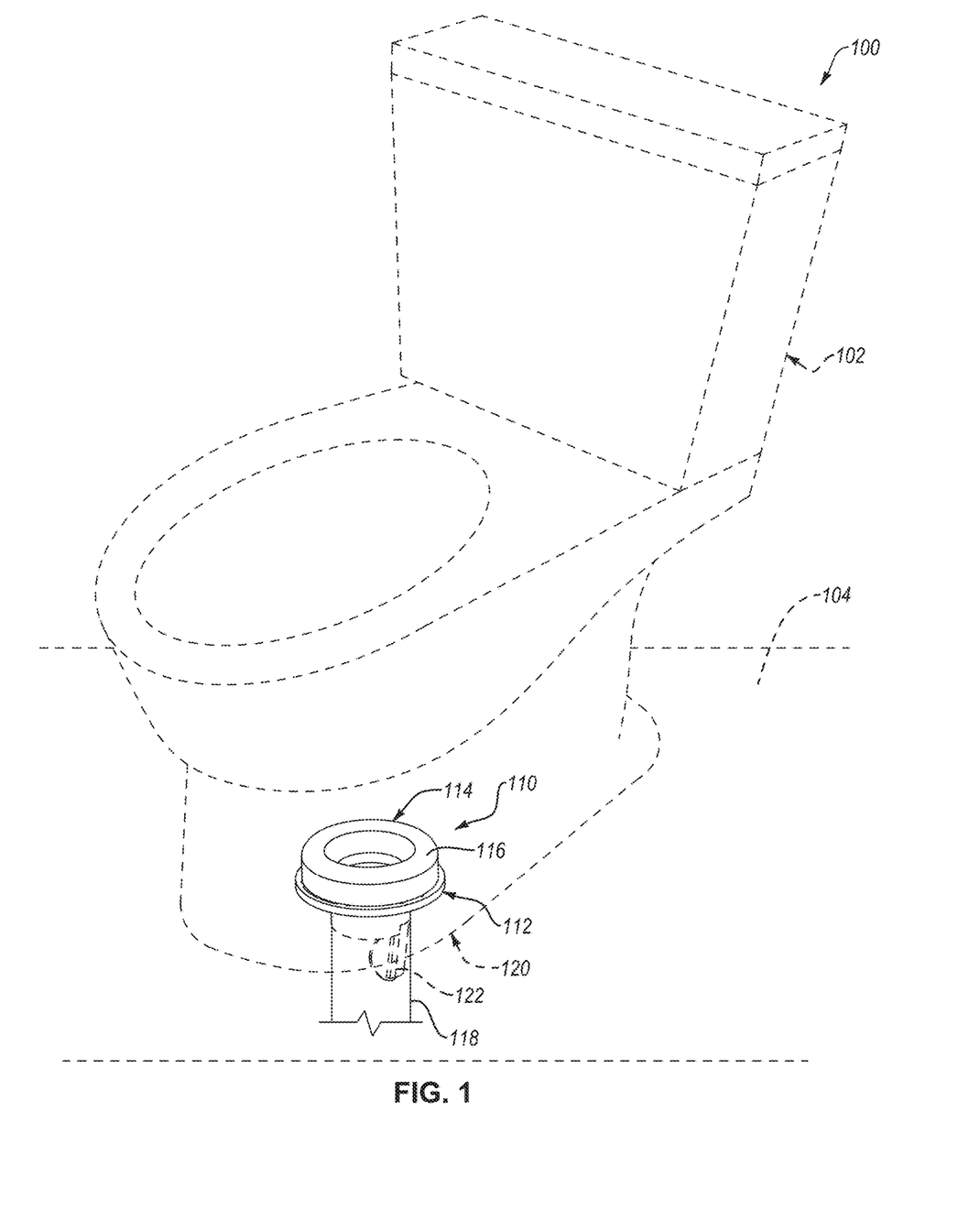
FIG. 1 is a schematic, perspective view of a toilet system, according to one or more examples of the present disclosure.

Referring to FIG. 1, according to some examples, disclosed herein is a toilet system 100 that includes a toilet 102, a toilet flange 112, and a passive backflow prevention apparatus 114. The toilet flange 112 helps provide a mechanical coupling of the toilet 102 to a structure, such as a floor 104 of a residential or commercial structure. and fluidic coupling of the toilet 102. The toilet flange 112 also provides a fluidic coupling of the toilet 102 to a sewer line of the structure. The structure includes a drain pipe 118 that is fluidically connected to a public sewer line. The drain pipe 118 is internal to the structure and is at least partially located underneath (e.g., in the flooring) or to the side (e.g., in the wall) of the toilet 102. Whether a single pipe, or coupled with other pipes, the drain pipe 118 helps direct waste fluid from the toilet 102 to the public sewer line.

Figure 2:
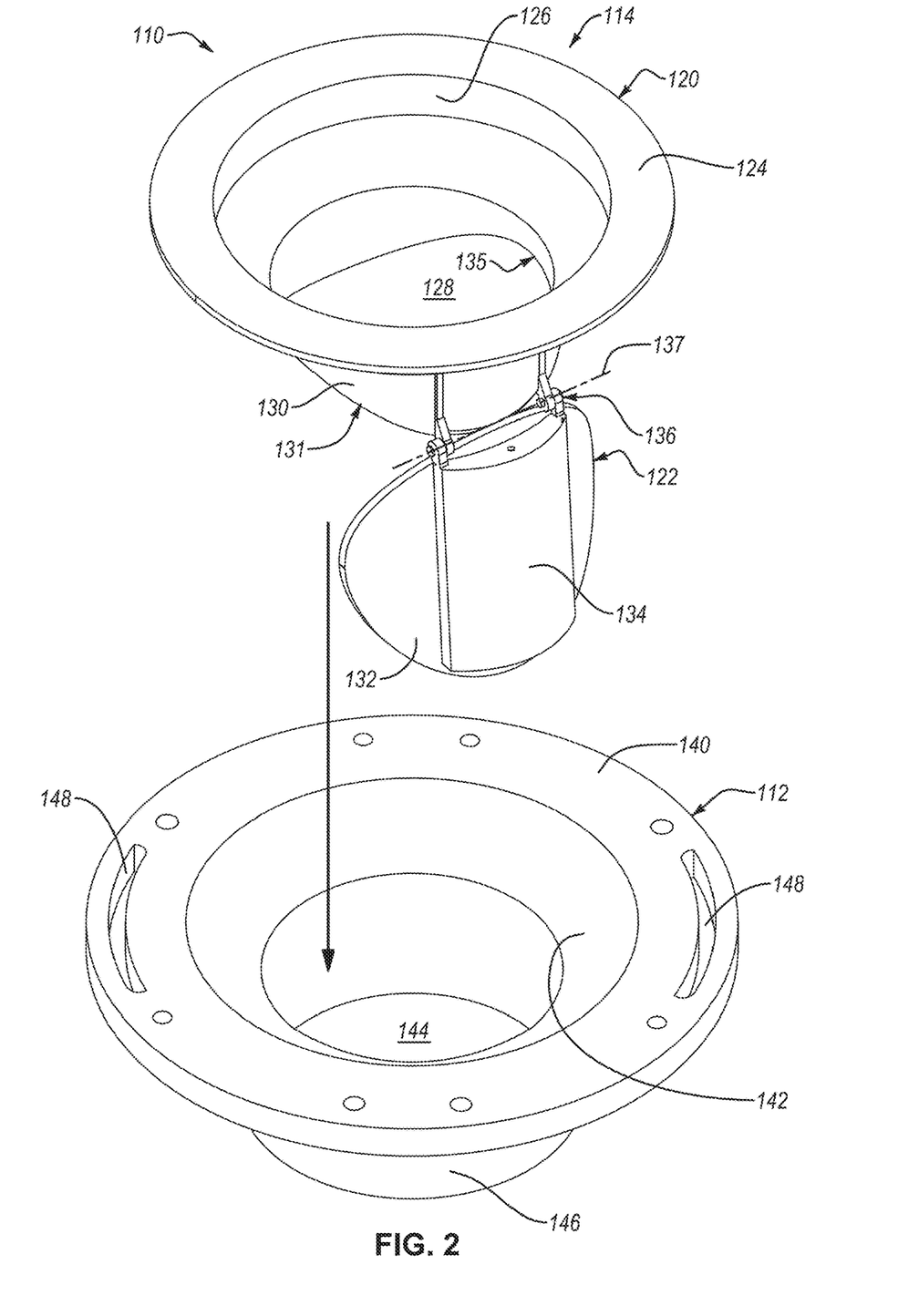
FIG. 2 is a schematic, exploded, perspective view of a toilet flange and a passive backflow prevention apparatus, according to one or more examples of the present disclosure.
Figure 3:
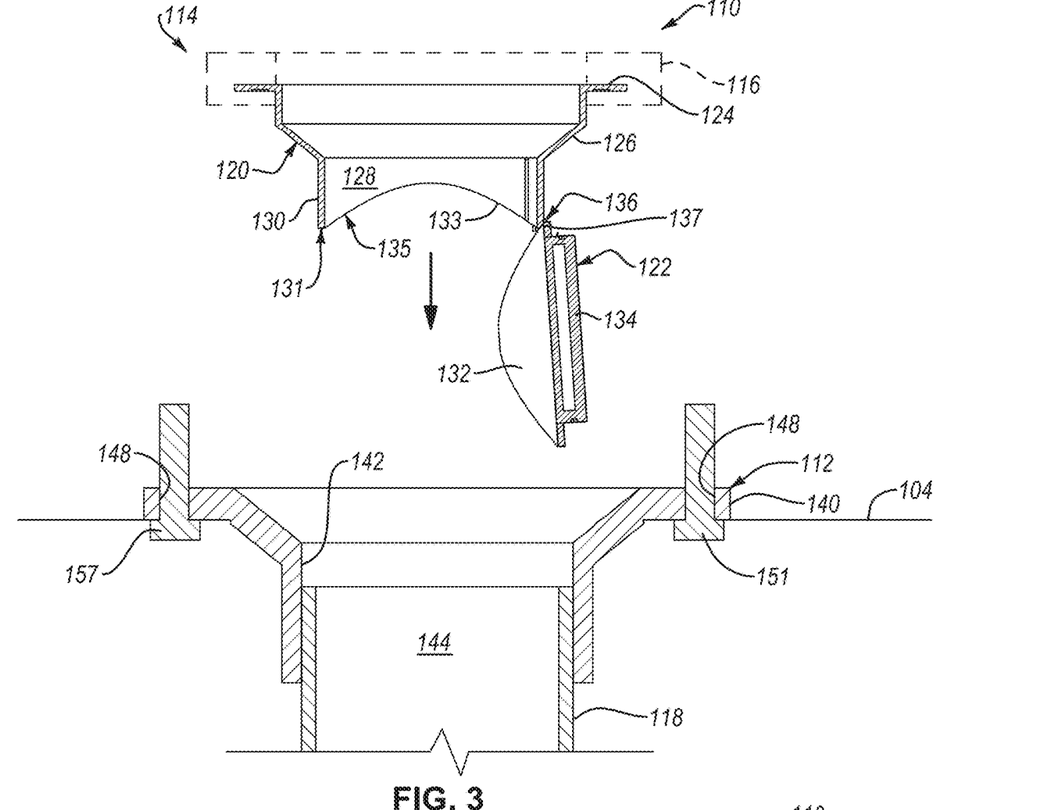
FIG. 3 is a schematic, exploded, sectional side elevation view of the toilet flange and the passive backflow prevention apparatus of FIG. 2, according to one or more examples of the present disclosure.
Figure 4:
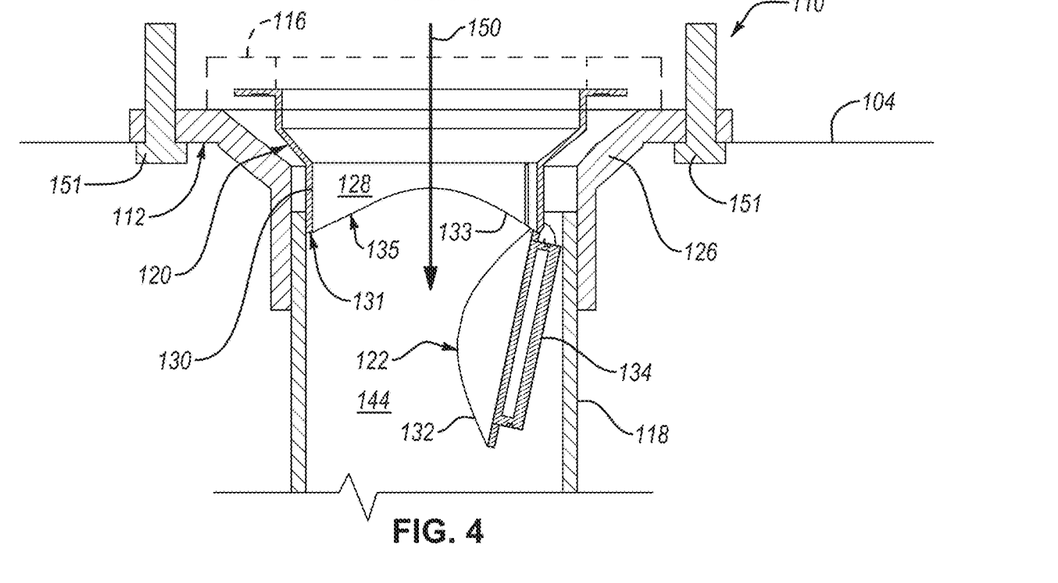
FIG. 4 is a schematic, sectional, side elevation view of the toilet flange and the passive backflow prevention apparatus of FIG. 2, with the passive backflow prevention apparatus in an open configuration, according to one or more examples of the present disclosure.

Referring to FIG. 2, in certain examples, the toilet flange 112 includes a flange portion 140 (e.g., an annular rim, collar, or rib), as well as a receptacle 142 coupled to the annular rim 124. The receptacle 142 defines a flange flow channel 144 of the toilet flange 112. At least a portion of the receptacle 142 converges to define a converging portion of the flange flow channel 144. As shown in FIGS. 3 and 4, the receptacle 142 is attached to the drain pipe 118 such that the flange flow channel 144 of the toilet flange is open to or fluidically coupled with a flow channel defined by the drain pipe 118. In this manner, a fluid flowing through the flow channel 144 in the outflow direction 150, as shown in FIG. 4, flows into the flow channel of the drain pipe 118 and ultimately flows into the public sewer line. Although not shown, the toilet flange 112 is fixed to the floor 104 via one or more fasteners that pass through the flange portion 140 and secure into the floor 104. The flange portion 140 also includes toilet-engaging slots 148 that receive fasteners 151. The fasteners 151 pass through the toilet-engaging slots 148 and engage corresponding holes of the toilet 102. With the fasteners 151 fastened to the toilet 102 in this manner, the toilet 102 is attached to the toilet flange 112. The base of the toilet 102 around the toilet flange 112 is supported on the floor 104.

Prior to attaching the toilet 102 to the toilet flange 112 via the fasteners 151, the passive backflow prevention apparatus 114 is at least partially inserted into the receptacle 142 of the toilet flange 112. The passive backflow prevention apparatus 114 includes a funnel 120 or horn that promotes a sealed fluidic coupling between the toilet flange 112 and the toilet 102. The funnel 120 includes an annular rim 124, a converging portion 126, and a non-converging portion 130. The converging portion 126 is interposed between the non-converging portion 130 and the annular rim 124. The funnel 120 additionally includes a funnel flow channel 128 that extends entirely through the funnel 120. The converging portion 126 of the funnel 120 is so called because it defines a converging portion of the funnel flow channel 128. Likewise, the non-converging portion 130 of the funnel 120 is so called because it defines a non-converging portion of the funnel flow channel 128.

As shown in solid line in FIG. 1, and in dashed line in FIGS. 3 and 4, in some examples, the passive backflow prevention apparatus 114 further includes a wax ring 116 that is coupled to the annular rim 124 of the funnel 120. In certain examples, the annular rim 124 is at least partially embedded in the wax ring 116. Accordingly, a portion of the wax ring 116 extends above, below, and radially outwardly away from the annular rim 124. The wax ring 116 is sized such that a diameter of the wax ring 116 corresponds with a diameter of the flange portion 140 of the toilet flange 112. Therefore, when the passive backflow prevention apparatus 114 is at least partially inserted into the receptacle 142 of the toilet flange 112, the wax ring 116 is supported on the flange portion 140 such that the annular rim 124 is spaced apart from the flange portion 140. The wax ring 116 comprises a deformable wax material that deforms under pressure. In some examples, the wax ring 116 can be replaced by another sealing material or component that promotes a seal between the flange portion 140 and the toilet 102.

After the passive backflow prevention apparatus 114 is at least partially inserted into the receptacle 142 of the toilet flange 112 and the wax ring 116 is supported on the flange portion 140 of the toilet flange 112, the toilet 102 can be attached to the toilet flange 112. Attachment of the toilet 102 includes positioning the toilet 102 above the toilet flange 112, such that a drain outlet of the toilet is in alignment with the flange flow channel 144 and the fasteners 151 are in alignment with corresponding holes in the base of the toilet 102, and lowering the toilet 102 onto the wax ring 116 such that the fasteners 151 extend through the corresponding holes in the base. The fasteners 151 are then used to tighten the toilet 102 to the toilet flange 112, such as via tightening nuts. As the toilet 102 is tightened to the toilet flange 112, the wax ring 116 deforms under the corresponding pressure to form a fluidic seal against the toilet 102 and the flange portion 140. The fluidic seal ensures any fluid flowing from the drain outlet of the toilet enters the flange flow channel 144 and drain pipe 118, via the funnel flow channel 128. However, under backflow conditions, such as when there is a backup of fluid in the public sewer line or the sewer line in the structure, this fluidic seal also ensures that backup fluid (e.g., backflow) flowing toward the toilet 102 also enters the drain outlet of the toilet 102, via the drain pipe 118, the flange flow channel 144, and the funnel flow channel 128, unless the backflow is prevented from entering the drain outlet. As disclosed below, the passive backflow prevention apparatus 114 is configured to passively close an opening to the funnel 120, in response to the presence of backflow, such that any backflow is prevented from passing through the funnel flow channel 128 and into the drain outlet of the toilet 102.

Referring to FIGS. 2-12, to help with prevention of backflow into the drain outlet of the toilet 102, the passive backflow prevention apparatus 114 includes a tubular base 131, a flap assembly 122, and a hinge 136. The tubular base 131 includes a non-planar end 133 that defines an opening 135. The tubular base 131 defines a fluid flow channel that acts as an extension of the funnel flow channel 128. In some examples, as shown in FIGS. 2-12, the tubular base 131 forms a part of the funnel 120 and the tubular base 131 is a seamless extension of the non-converging portion 130 of the funnel 120. However, as will be explained below, and referring to FIGS. 13-15, the tubular base 131 is separate from and attached to the non-converging portion 130 of the funnel 120. The non-planar end 133 is non-planar because all portions of the end surface defining the non-planar end 133 do not lie in the same plane. The tubular base 131 is sized to fit within the smallest diameter of the flange flow channel 144, and, in some examples, and to fit within the smallest diameter of the drain pipe 118.

The flap assembly 122 is pivotably coupled to the tubular base 131 via the hinge 136. The hinge 136 enables the flap assembly 122 to pivot from an open position (see, e.g., FIGS. 3, 4, 7, and 9-11) to a closed position (see, e.g., FIGS. 6, 8, and 12) and pivot from the closed position to the open position (i.e., pivot between the open position and the closed position). The flap assembly 122 includes a non-planar flap 132 and a float 134 fixed to the non-planar flap 132. The non-planar flap 132 is non-planar because all portions of each one of the broad surfaces defining the non-planar flap 132 do not lie in the same plane. The non-planar shape of the non-planar flap 132 corresponds with the non-planar shape of the non-planar end 133 of the tubular base 131. In some examples, the non-planar flap 132 is arc-shaped and curves about an axis that is perpendicular to the axis 137, as shown in FIG. 2 and explained in more detail below. Accordingly, when the flap assembly 122 is in the closed position, the non-planar flap 132 of the flap assembly 122 is engaged (e.g., in direct contact with) with the non-planar end 133 to cover or close the opening 135. In other words, the non-planar flap 132 forms a fluidic seal against the non-planar end 133 when the flap assembly 122 is in the closed position. In contrast, when the flap assembly 122 is in the open position, the non-planar flap 132 of the flap assembly 122 is disengaged (e.g., out of direct contact with) with the non-planar end 133 to uncover or open the opening 135.

Figure 7:
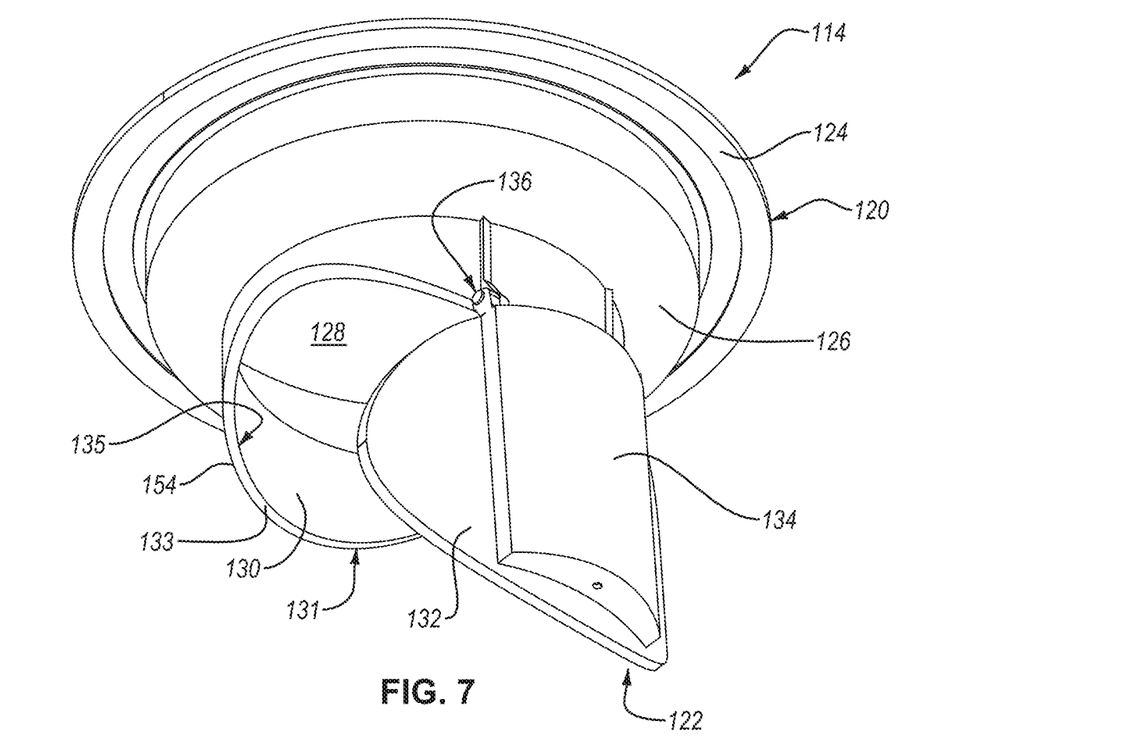
FIG. 7 is a schematic, perspective view of the passive backflow prevention apparatus of FIG. 2, with the passive backflow prevention apparatus in the open configuration, according to one or more examples of the present disclosure.
Figure 8:
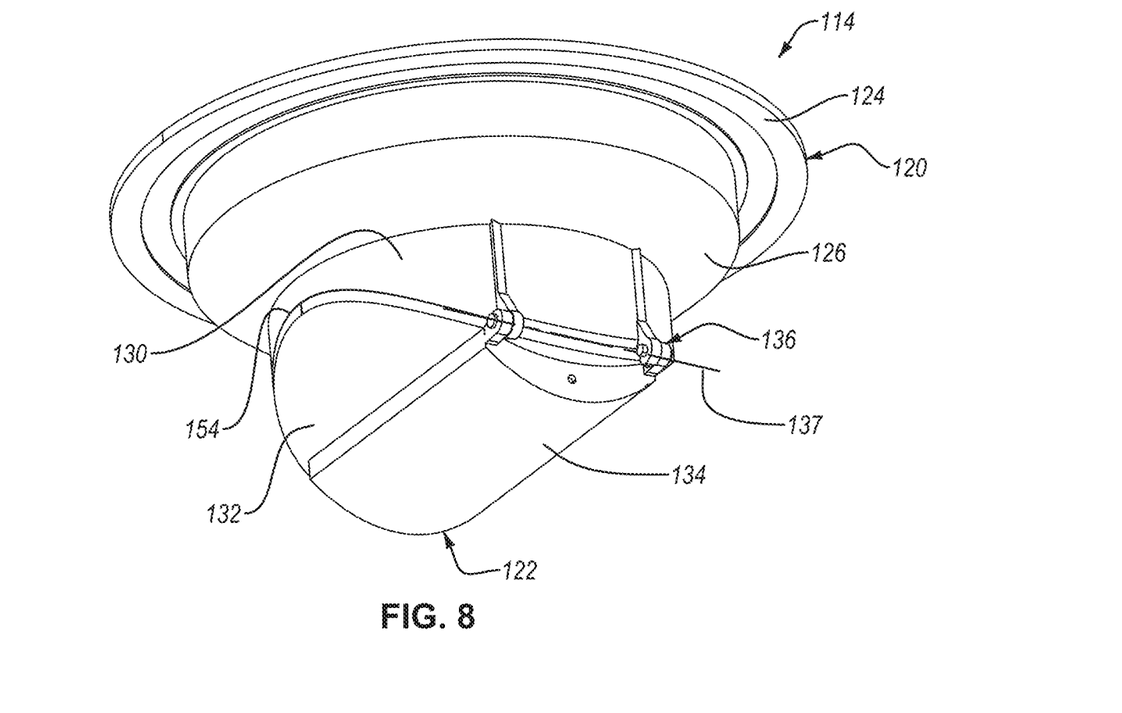
FIG. 8 is a schematic, perspective view of the passive backflow prevention apparatus of FIG. 2, with the passive backflow prevention apparatus in the closed configuration, according to one or more examples of the present disclosure.
Figure 9:
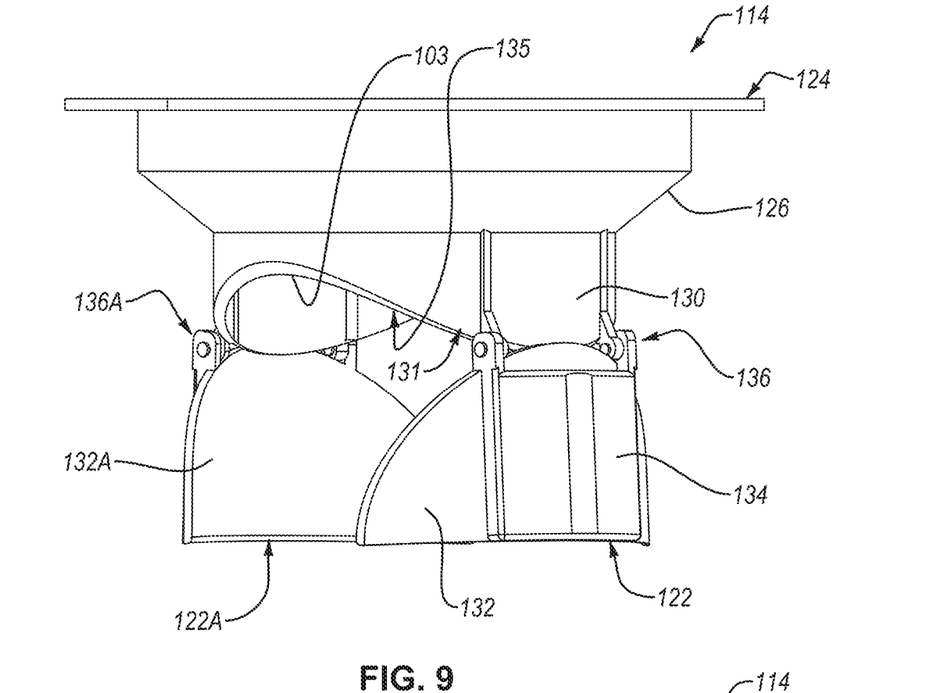
FIG. 9 is a schematic, side elevation view of a passive backflow prevention apparatus, in an open configuration, according to one or more examples of the present disclosure.
Figure 10:
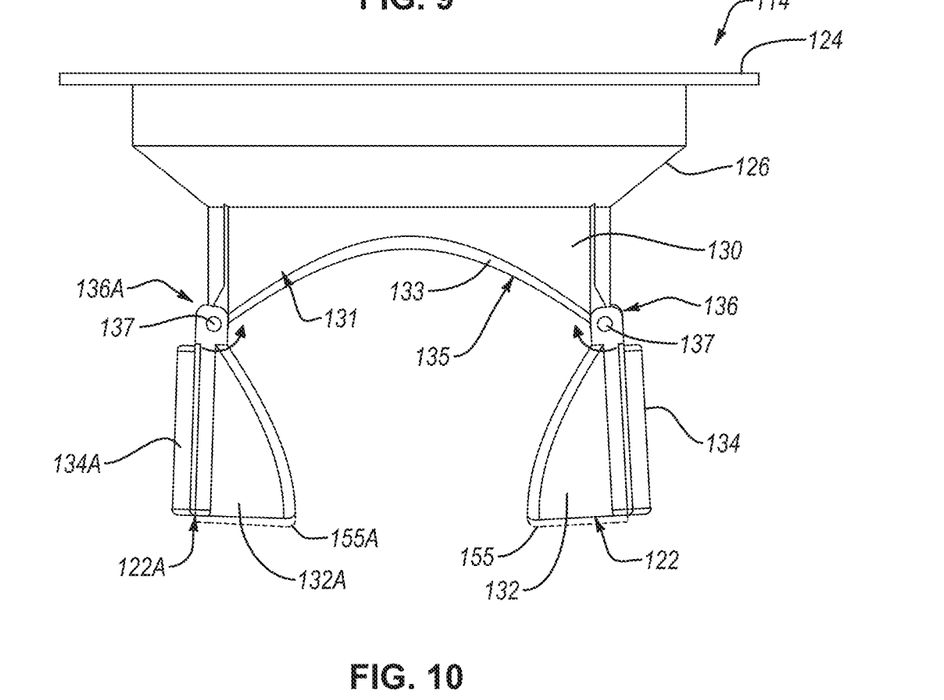
FIG. 10 is a schematic, front elevation view of the passive backflow prevention apparatus of FIG. 9, in the open configuration, according to one or more examples of the present disclosure.
Figure 11:
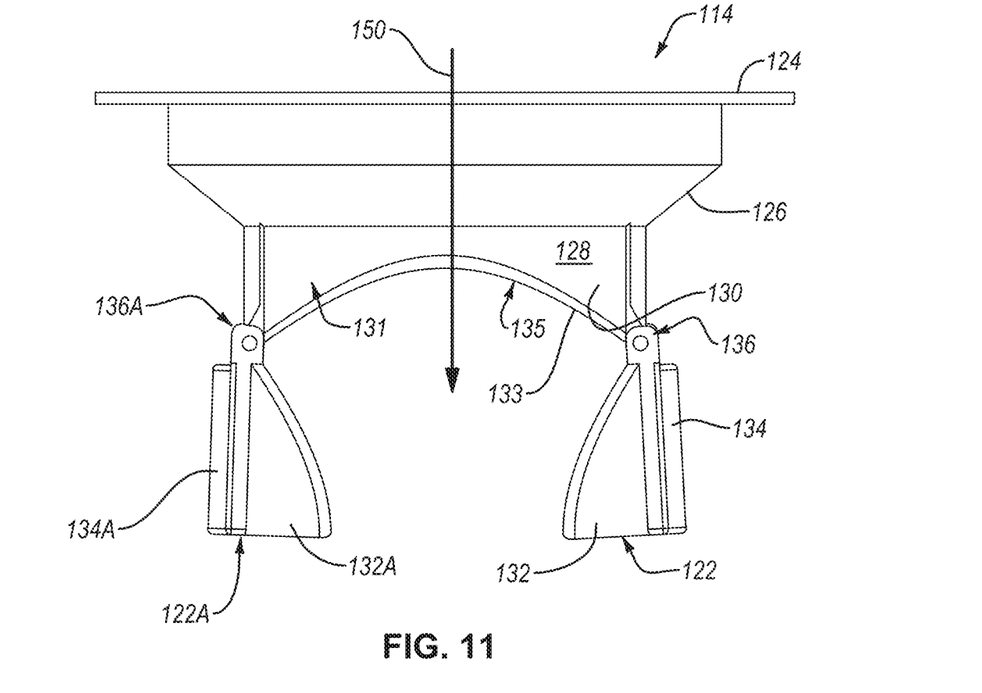
FIG. 11 is a schematic, sectional, front elevation view of the passive backflow prevention apparatus of FIG. 9, in the open configuration, according to one or more examples of the present disclosure.
Figure 12:
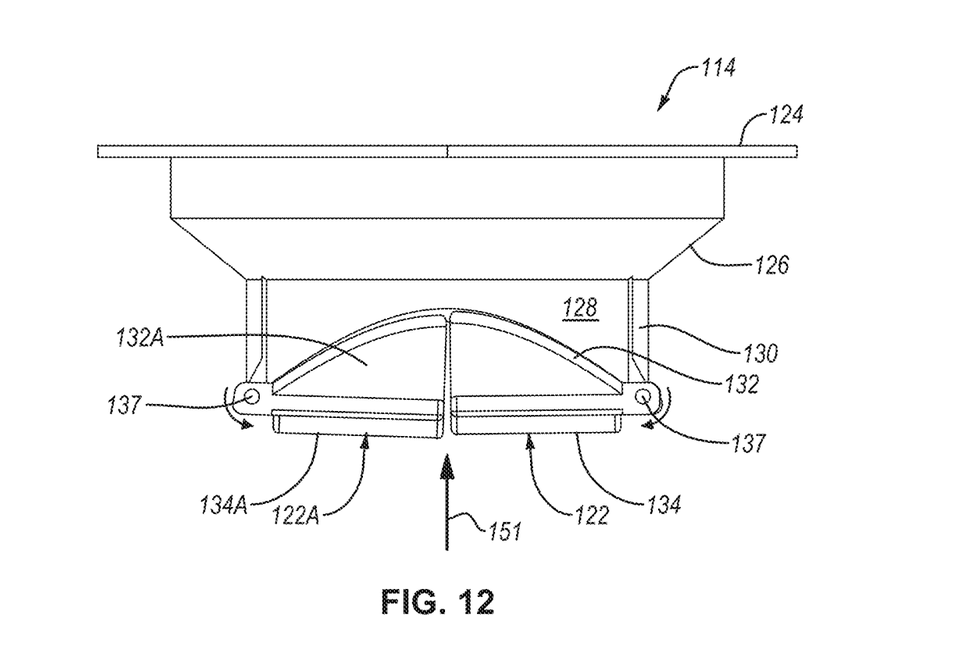
FIG. 12 is a schematic, sectional, front elevation view of the passive backflow prevention apparatus of FIG. 9, in a closed configuration, according to one or more examples of the present disclosure.

In certain examples, as shown in FIGS. 7 and 8, the tubular base 131 further includes an annular gasket 154 that defines the non-planar end 133 of the tubular base 131. The annular gasket 154 promotes formation of a fluidic seal against the non-planar flap 132 when the flap assembly is in the closed position. In some examples, alternatively or additionally, an annular gasket can form part of the non-planar flap 132 to promote formation of a fluidic seal against the non-planar end 133.

The hinge 136 can be any of various hinges and have any of vary hinge configurations that enable pivoting of the flap assembly 122, toward and away from the non-planar end 133, about the axis 137 that is perpendicular to the outflow direction 150. In the illustrated examples, the hinge 136 includes a pair of spaced apart tabs on each one of an outer circumferential surface of the tubular base 131, proximate non-planar end 133, and an outer circumferential surface of the non-planar flap 132. One pin, or a pair of pins, can then pass through the tabs to couple the tabs together and to enable pivoting of the tabs relative to each other about a central axis (i.e., the axis 137) of the pin or pins.

Because the shape of the non-planar flap 132 is non-planar (e.g., curved), the non-planar flap 132 can be pivoted about the axis 137, when positioned within the flange flow channel 144 and the flow channel of the drain pipe 118. In other words, the non-planar flap 132 does not impact or is not impeded by the toilet flange 112 or the drain pipe 118 as it pivots, within the toilet flange 112 and the drain pipe 118, about the axis 137. Moreover, because the shape of the non-planar flap 132 is non-planar, the non-planar flap 132 is confined within a footprint of the tubular base 131 when the flap assembly 122 is in the open position or in the closed position.

The float 134 has a material density that is less than a material density of the non-planar flap 132. The material density of the float 134 is less than water in certain examples. In some examples, the float 134 defines a pocket that is filled with air. In other examples, the float 134 is made of a foam or other material that is more porous than that of the non-planar flap 132. The float 134, being less dense than the non-planar flap 132, promotes buoyancy of the flap assembly 122 in the presence of backflow, which helps to pivot the flap assembly 122 from the open position to the closed position, as described below. The float 134 can be separately formed and attached to the non-planar flap 132. Alternatively, the float 134 can be co-formed with the non-planar flap 132 to form a one-piece monolithic construction with the non-planar flap 132. In the illustrated examples, the float 134 is coupled to and extends outwardly from an outer circumferential surface of the non-planar flap 132. However, in other examples, the float 134 is coupled to and extends inwardly from an inner circumferential surface of the non-planar flap 132. In alternative examples, the flap assembly 122 does not include a float and the non-planar flap 132 has a material density that is less than that of water.

Referring to FIG. 4, in normal operation of the toilet 102, the sewer line of the structure, and the public sewer line (i.e., no sewage backflow occurring), gravity urges and keeps the flap assembly 122 in the open position. In the open position, waste fluid from the toilet 102 is allowed to flow, unobstructed, through the funnel flow channel 128, the flange flow channel 144, and the flow channel of the drain pipe 118 in the outflow direction 150. Moreover, fluid flowing in the outflow direction 150 further urges the flap assembly 122 into the open position.

However, in abnormal operation of the toilet 102, the sewer line of the structure, and the public sewer line (i.e., sewage backflow 161 is occurring and flowing in the backflow direction 153 (see, e.g., FIGS. 5 and 6)), the backflow 161 urges the flap assembly 122 into the closed position. Moreover, the pressure from the backflow 161 keeps the flap assembly 122 in the closed position. As discussed above, with the flap assembly 122 in the closed position, backflow 161 is prevented from flowing into the toilet 102 due to the seal created between the flap assembly 122 and the non-planar end 133 of the tubular base 131. The presence of the backflow 161 passively urges the flap assembly 122 into the closed position because the flap assembly 122 effectively floats on top of the backflow 161 due to the relatively low density of the non-planar flap 132 and/or the float 134 affixed to the non-planar flap 132. As shown in FIG. 4, in the open position, in some examples, the flap assembly 122 is slightly angled into the flow channel of the drain pipe 118. As the backflow 161 rises, a portion of the backflow 161 impacts and applies a pressure acting in the backflow direction 153. This pressure acts as a cantilever force to pivot the non-planar flap 132 toward the funnel 120. The float 134 promotes this action by providing buoyancy, relative to the backflow 161, thus reducing the force necessary to pivot the non-planar flap 132 toward the funnel 120.

As long as backflow 161 is present, the flap assembly 122 will remain in the closed position to seal off the toilet 102 from the backflow 161. As the backflow 161 recedes, and the pressure acting on the flap assembly in the backflow direction 153 lowers, the flap assembly 122 pivots away from the funnel 120 and returns to the open position, ready for normal operation of the toilet 102.

Figure 5:
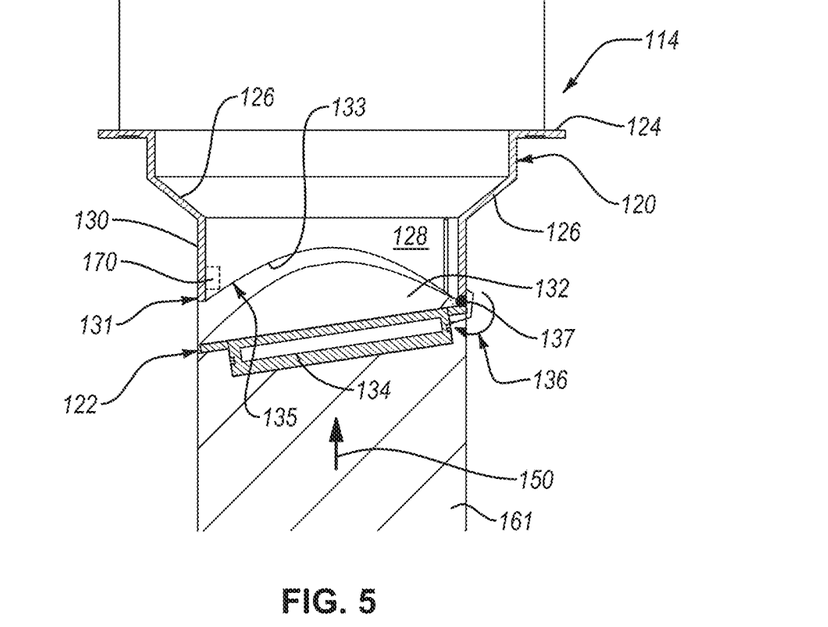
FIG. 5 is a schematic, sectional, side elevation view of the passive backflow prevention apparatus of FIG. 2, with the passive backflow prevention apparatus transitioning from the open configuration to a closed configuration, according to one or more examples of the present disclosure.
Figure 6:
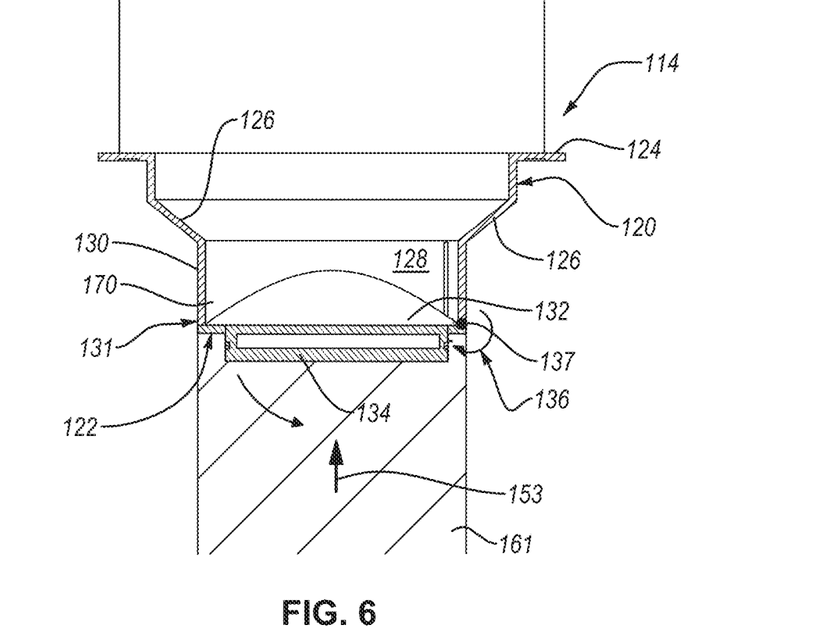
FIG. 6 is a schematic, sectional side elevation view of the passive backflow prevention apparatus of FIG. 2, with the passive backflow prevention apparatus in the closed configuration, according to one or more examples of the present disclosure.

In some examples, as shown in FIGS. 5 and 6, the passive backflow prevention apparatus 114 includes a sensor 170, which is coupled to the tubular base 131 in certain examples. The sensor 170 is configured to detect when the flap assembly 122 is in the closed position, which indicates backflow conditions are present. Accordingly, the sensor 170 can be defined as a backflow detection sensor. In one example, the sensor 170 is a self-powered, wireless sensor (e.g., switch) that transmits a wireless signal to a receiver at least when the sensor 170 detects the flap assembly 122 in the closed position. The receiver can be any of various user devices, such as cell phones, computers, tablets, servers, and the like. Because the passive backflow prevention apparatus 114 prevents the backflow 161 from entering the toilet 102, visual detection of backflow conditions by a user is ineffective. The sensor 170 obviates this issue by providing sensing means for detecting backflow conditions.

Referring to FIGS. 9-12, in some examples, the passive backflow prevention apparatus 114 includes two flap assemblies instead of one. For example, the passive backflow prevention apparatus 114 of FIGS. 9-12 includes the flap assembly 122 and a second flap assembly 122A. The second flap assembly 122A is like the flap assembly 122 in that it has a second non-planar flap 132A and a second float 134A. Also, a second hinge 136A enables the second flap assembly 122A to pivot. The flap assembly 122 of FIGS. 9-12 is configured the same as, and operates in the same manner as, the flap assembly 122 of the passive backflow prevention apparatus 114 of FIGS. 2-8. However, unlike the flap assembly 122 of FIGS. 2-8, when in the closed position, the flap assembly 122 of FIGS. 9-12 engages only a portion of the covers only a portion (e.g., half) of the non-planar end 133 and covers only a portion (e.g., half) of the opening 135. The other portion (e.g., other half) of the non-planar end 133 is engaged by the second flap assembly 122A and the other portion (e.g., other half) of the opening 135 is covered by the second flap assembly 122A when the second flap assembly 122A is in the closed position. Additionally, when in the closed position, the flap assembly 122 and the second flap assembly 122A engage each other (e.g., are in direct contact with each other) to close the opening 135. In certain examples, one or both of the flap assembly 122 and the second flap assembly 122A includes a gasket, such as gasket 155 and second gasket 155A, respectively, that promotes a seal between the flap assembly 122 and the second flap assembly 122A when in the closed position.

Figure 13:
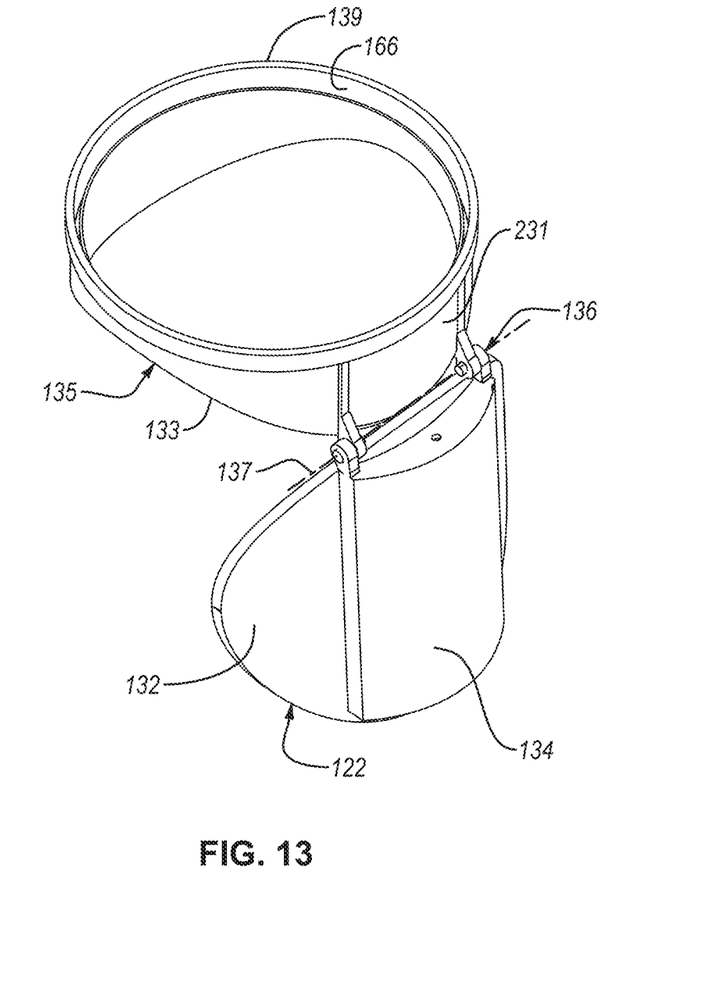
FIG. 13 is a schematic, perspective view of a tubular base and a flap assembly, in an open configuration, of a passive backflow prevention apparatus, according to one or more examples of the present disclosure.
Figure 14:
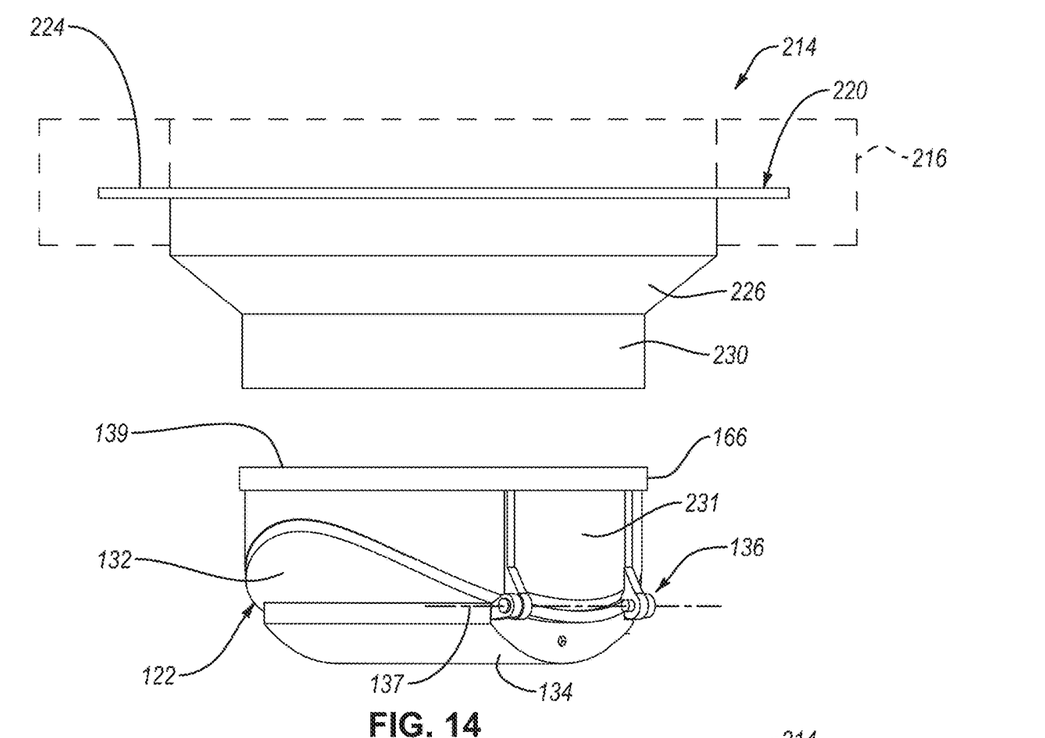
FIG. 14 is a schematic, exploded, side elevation view of a passive backflow prevention apparatus, in a closed configuration, according to one or more examples of the present disclosure.
Figure 15:
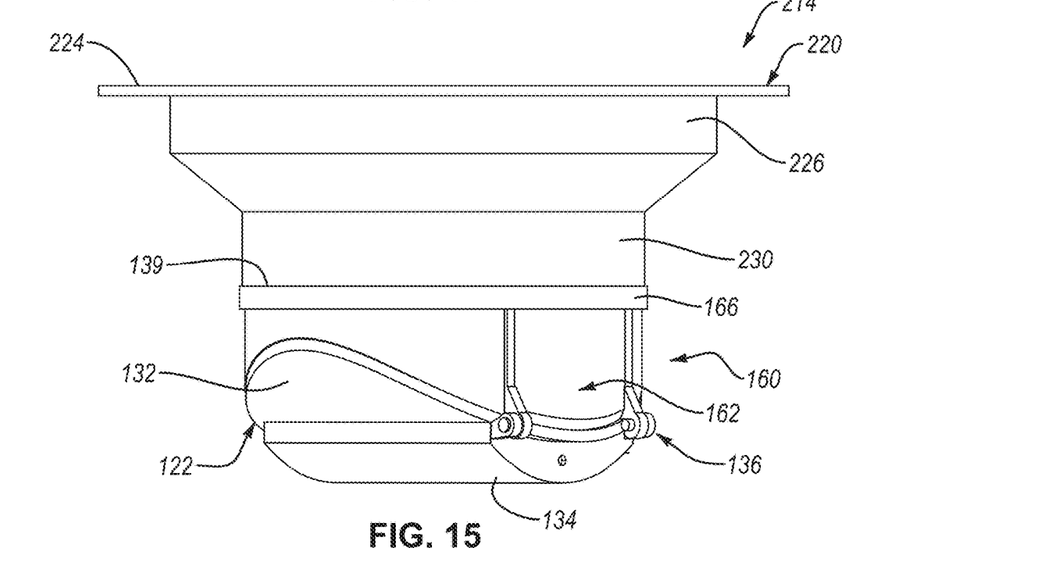
FIG. 15 is a schematic, side elevation view of the passive backflow prevention apparatus of FIG. 14, in the closed configuration, according to one or more examples of the present disclosure.

Referring to FIGS. 13-15, in some examples, a passive backflow prevention apparatus 214 includes features similar to those of the passive backflow prevention apparatus 114, with like numbers referring to like features. For example, the passive backflow prevention apparatus 214 includes a funnel 220, which has an annular rim 224, a non-converging portion 230, and a converging portion 226, and includes a wax ring 216. However, unlike the passive backflow prevention apparatus 114, a non-converging portion 230 of a funnel 220 of the passive backflow prevention apparatus 214 and a tubular base 231 do not form a one-piece seamless construction. Rather, the tubular base 231 is formed separately from the non-converging portion 230 and attached to the non-converging portion 230 to form the passive backflow prevention apparatus 214. Moreover, the flap assembly 122 is pivotably coupled to the tubular base 231 via the hinge 136. In some examples, to help facilitate attachment of the non-converging portion 230 to the tubular base 231, the tubular base 231 (or alternatively the non-converging portion 230) includes a circumferential recessed ledge 166 at a second end 139 of the tubular base 231. The circumferential recessed ledge 166 is configured to receive the tubular base 231 in seated engagement. A glue or other bonding agent can be used to secure the tubular base 231 to the circumferential recessed ledge 166. In some examples, the configuration of the passive backflow prevention apparatus 214 enables a conventional funnel to be retrofitted with a flap assembly 122.

Figure 16:
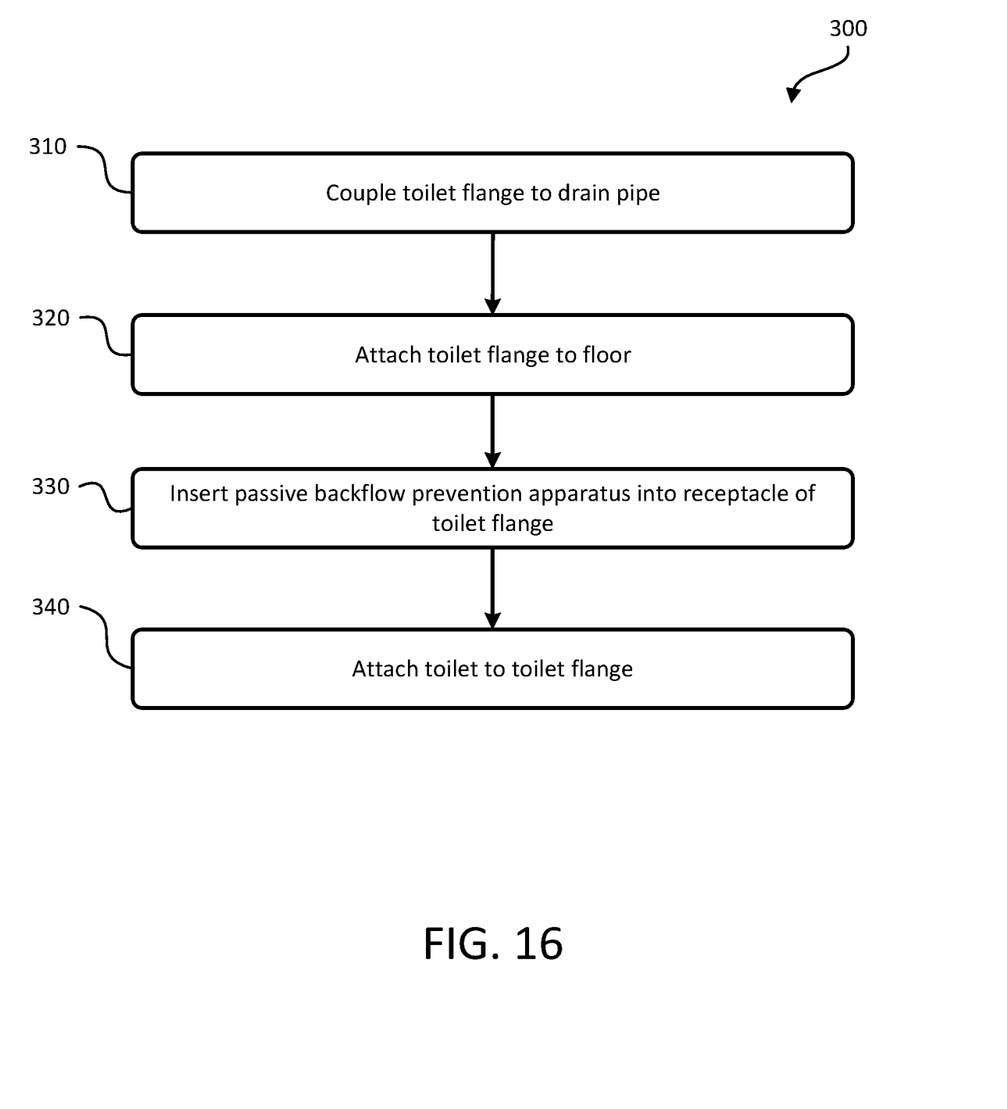
FIG. 16 is a schematic flow chart of a method of installing a toilet system, according to one or more examples of the present disclosure.

Referring to FIG. 16, in some examples, a method 300 of installing the toilet system 100 includes (block 310) coupling the toilet flange 112 to the drain pipe 118 and (block 320) attaching the toilet flange 112 to the floor 104. The method 300 also includes (block 330) inserting the passive backflow prevention apparatus 114 into the receptacle 142 of the toilet flange 112 such that the flap assembly 122 of the passive backflow prevention apparatus 114 passes through and is at least partially positioned within the receptacle 142 of the toilet flange 112 and the drain pipe 118. In certain examples, the passive backflow prevention apparatus 114 is formed by attaching the funnel 220 to the tubular base 131 such that the funnel 220 is seated in the circumferential ledge 166 of the tubular base 131. The method 300 further includes (block 340) attaching the toilet 102 to the toilet flange 112 such that the wax ring 116 of the passive backflow prevention apparatus 114 is sandwiched between and forms a fluidic seal against the toilet flange 112 and the toilet 102.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A passive backflow prevention apparatus comprising:
a tubular base, comprising a non-planar end that defines an opening, wherein the tubular base further comprises a circumferential recessed ledge at a second end of the tubular base, the second end is opposite the non-planar end;

a flap assembly, comprising a non-planar flap;
a hinge, pivotably coupling together the tubular base and the flap assembly such that the flap assembly is pivotable from an open position, in which the non-planar flap of the flap assembly is disengaged with the non-planar end enabling a fluid, flowing in a first direction, through the opening, to a closed position, in which the non-planar flap of the flap assembly is engaged with the non-planar end preventing a fluid, flowing in a second direction, through the opening; and
a funnel, comprising an annular rim, a non-converging portion, and a converging portion which is interposed between the annular rim and the non-converging portion, wherein the non-converging portion sits in the circumferential recessed ledge.

2. The passive backflow prevention apparatus according to claim 1, wherein the hinge is fixed to a circumferential surface of the tubular base such that the flap assembly pivots about an axis that is perpendicular to the first direction and the second direction.

3. The passive backflow prevention apparatus according to claim 2, wherein the non-planar flap is arc-shaped and curves about an axis that is perpendicular to the axis.

4. The passive backflow prevention apparatus according to claim 3, wherein:
the tubular base further comprises an annular gasket; and
the annular gasket defines the non-planar end of the tubular base.

5. The passive backflow prevention apparatus according to claim 1, further comprising:
a second flap assembly, comprising a second flap having a second non-planar body that has a second planar end and a second float fixed to the second flap, wherein the non-planar flap has a first non-planar body that has a first planar end; and
a second hinge, pivotally coupling together the tubular base and the second flap assembly such that the second flap assembly is pivotable from a second open position, in which the second flap of the second flap assembly is disengaged with the non-planar end enabling the fluid, flowing in the first direction, through the opening, to a second closed position, in which the second flap of the second flap assembly is engaged with the non-planar end preventing the fluid, flowing in the second direction, through the opening.

6. The passive backflow prevention apparatus according to claim 5, wherein when the flap assembly is in the closed position and the second flap assembly is in the second closed position, the non-planar flap and the second flap are in direct contact with each other.

7. The passive backflow prevention apparatus according to claim 6, wherein:
at least one of the non-planar flap or the second flap comprises a gasket; and
when the flap assembly is in the closed position and the second flap assembly is in the second closed position, the gasket forms a seal between the non-planar flap and the second flap.

8. The passive backflow prevention apparatus according to claim 5, wherein, when the flap assembly is in the closed position and the second flap assembly is in the second closed position, the non-planar flap covers a first half of the opening and the covers a second half of the opening.

9. The passive backflow prevention apparatus according to claim 1, wherein:
the flap assembly further comprises a float fixed to the non-planar flap; and
the float has a material density that is less than a material density of the non-planar flap.

10. The passive backflow prevention apparatus according to claim 9, wherein the float comprises a pocket filled with air.

11. The passive backflow prevention apparatus according to claim 1, wherein, in the closed position, the non-planar flap forms a seal against the non-planar end of the tubular base.

12. The passive backflow prevention apparatus according to claim 1, further comprising a wax ring coupled to the annular rim such that the annular rim is at least partially embedded in the wax ring.

13. The passive backflow prevention apparatus according to claim 1, wherein the non-planar flap is made of a material that has a material density less than of water.

14. A passive backflow prevention apparatus comprising:
a tubular base, comprising a non-planar end that defines an opening;
a flap assembly, comprising a non-planar flap;
a hinge, pivotably coupling together the tubular base and the flap assembly such that the flap assembly is pivotable from an open position, in which the non-planar flap of the flap assembly is disengaged with the non-planar end enabling a fluid, flowing in a first direction, through the opening, to a closed position, in which the non-planar flap of the flap assembly is engaged with the non-planar end preventing a fluid, flowing in a second direction, through the opening; and
a funnel, comprising an annular rim, a non-converging portion, and a converging portion which is interposed between the annular rim and the non-converging portion, wherein the tubular base is coupled to the non-converging portion such that the tubular base is a seamless extension of the non-converging portion.

15. The passive backflow prevention apparatus according to claim 14, further comprising a wax ring coupled to the annular rim such that the annular rim is at least partially embedded in the wax ring.

16. A toilet system, comprising:
a toilet;
a toilet flange, comprising a receptacle and toilet-engaging slots, wherein the toilet flange is attached to the toilet;
a passive backflow prevention apparatus, positioned between the toilet and the toilet flange, the passive backflow prevention apparatus comprising:
a funnel, comprising an annular rim, a non-converging portion, and a converging portion, which is interposed between the annular rim and the non-converging portion;
a tubular base, coupled to the non-converging portion of the funnel and comprising a non-planar end that defines an opening;
a flap assembly, comprising a non-planar flap and a float fixed to the non-planar flap; and
a hinge, pivotally coupling together the tubular base and the flap assembly such that the flap assembly is pivotable from an open position, in which the non-planar flap of the flap assembly is disengaged with the non-planar end, to a closed position, in which the non-planar flap of the flap assembly is engaged with the non-planar end,
wherein:
when positioned between the toilet and the toilet flange, at least a portion of the funnel, at least a portion of the flap assembly, and at least a portion of the hinge are positioned in the receptacle of the toilet flange;

when the flap assembly is in the open position, a fluid, flowing in a first direction, through the toilet flange and away from toilet, is flowable through the opening; and when the flap assembly is in the closed position, a fluid, flowing in a second direction, through the toilet flange and toward the toilet, is not flowable through the opening.

17. A method of installing a toilet system, the method comprising steps of:

coupling a toilet flange to a drain pipe;

attaching the toilet flange to a floor;

inserting a passive backflow prevention apparatus into a receptacle of the toilet flange such that a flap assembly of the passive backflow prevention apparatus passes through and is at least partially positioned within the receptacle of the toilet flange and the drain pipe, wherein the flap assembly is pivotable, within at least a portion of the receptacle and the drain pipe, from an open position to a closed position; and attaching a toilet to the toilet flange such that a wax ring of the passive backflow prevention apparatus is sandwiched between and forms a fluidic seal against the toilet flange and the toilet.

18. The method according to claim 17, further comprising a step of forming the passive backflow prevention apparatus by attaching a funnel to a tubular base such that the funnel is seated in a circumferential ledge of the tubular base, wherein the flap assembly is pivotably coupled to the tubular base via a hinge.

* * * * *